United States Patent [19]

Mathers et al.

[11] Patent Number: 5,942,280

[45] Date of Patent: Aug. 24, 1999

[54] METHOD OF MAKING RETROREFLECTIVE ELEMENTS

[75] Inventors: James Patrick Mathers; Kathleen Marie Humpal, both of Woodbury, Minn.

[73] Assignee: 3M Innovative Properties Company, St. Paul, Minn.

[21] Appl. No.: 08/931,213

[22] Filed: Sep. 16, 1997

[51] Int. Cl.⁶ .............................. B05D 5/06; B22D 11/01; C01F 11/00

[52] U.S. Cl. ........................... 427/163.4; 404/14; 264/15; 427/204; 427/205; 427/215; 427/219; 427/242

[58] Field of Search ..................................... 359/536, 538, 359/539, 540, 541; 427/163.4, 204, 205, 215, 219, 242; 264/15; 404/14

[56] References Cited

U.S. PATENT DOCUMENTS

| | | | |
|---|---|---|---|
| 2,043,414 | 6/1936 | Korff | 88/79 |
| 2,440,584 | 4/1948 | Heltzer et al. | 88/82 |
| 3,043,196 | 7/1962 | Palmquist et al. | 88/82 |
| 3,171,827 | 3/1965 | DeVries et al. | 260/40 |
| 3,175,935 | 3/1965 | Vanstrum | 156/3 |
| 3,252,376 | 5/1966 | DeVries | 88/82 |
| 3,254,563 | 6/1966 | DeVries et al. | 88/82 |
| 3,274,888 | 9/1966 | Vanstrum et al. | 88/82 |
| 3,279,316 | 10/1966 | Penton et al. | 88/82 |
| 3,292,507 | 12/1966 | Vanstrum | 94/1.5 |
| 3,418,896 | 12/1968 | Rideout | 94/1.5 |
| 3,486,952 | 12/1969 | Vanstrum et al. | 156/3 |
| 3,499,371 | 3/1970 | Jonnes et al. | 94/1.5 |
| 3,556,637 | 1/1971 | Palmquist | 350/105 |
| 3,584,932 | 6/1971 | Terrill et al. | 350/105 |
| 3,709,706 | 1/1973 | Sowman | 106/57 |

(List continued on next page.)

FOREIGN PATENT DOCUMENTS

| | | |
|---|---|---|
| 0322671 | 7/1989 | European Pat. Off. . |
| 0 565 765 A2 | 10/1993 | European Pat. Off. . |
| WO97/28471 | 8/1997 | WIPO . |

OTHER PUBLICATIONS

Vedam et al., "Retroreflection from Spherical Glass Beads in Highway Pavement Markings. 2: Diffuse Reflection (a first approximation calculation)," *Applied Optics*, vol. 17, No. 12, pp. 1859–1869 (Jun. 15 1978).

ANSI Standard PH2.17–1985 Density Measurements—Geometric Conditions for Reflection Density (Jul. 3 1985).

ASTM Standard E809–94A, Standard Practice for Measuring Photometric Characteristics of Retroreflectors (no date).

D. J. Godfrey. "Fabrication, Formulation, Mechanical Properties, and Oxidation of Sintered $Si_3N_4$ Ceramics Using Disc Specimens," *Mat. Sci. and Technology*, vol. 1, pp. 510–515 (Jul. 1985).

U.S. Defensive Publication No. T987003 (Oct. 2 1979).

*Primary Examiner*—Janyce Bell
*Attorney, Agent, or Firm*—Lisa M. Fagan

[57] ABSTRACT

A method of making a ceramic retroreflective element having enhanced strength and increased retained reflectivity. The method of the present invention comprises forming retroreflective elements by the following steps:

a) providing glass flakes;

b) coating said glass flakes with a first barrier layer yielding coated glass flakes;

c) providing optical elements;

d) optionally coating said optical elements with a second barrier layer;

e) blending said optical elements and said coated glass flakes;

f) heating said optical elements and said coated glass flakes to spheroidize said flakes while agitating said optical elements and said coated glass flakes;

g) further heating said optical elements and said spheroidized glass flakes to partially embed said optical elements in said spheroidized flakes while agitating said optical elements and said spheriodized flakes; and h) cooling said spheroidized flakes having partially embedded optical elements.

26 Claims, 1 Drawing Sheet

U.S. PATENT DOCUMENTS

| | | | |
|---|---|---|---|
| 3,849,351 | 11/1974 | Jorgensen | 260/18 N |
| 3,891,451 | 6/1975 | Okazaki et al. | 106/30 |
| 3,935,158 | 1/1976 | Watanabe | 260/42.21 |
| 4,035,059 | 7/1977 | DeMaster | 350/105 |
| 4,069,281 | 1/1978 | Eigenmann | 264/1 |
| 4,072,403 | 2/1978 | Eigenmann | 350/105 |
| 4,166,147 | 8/1979 | Lange et al. | 428/328 |
| 4,203,878 | 5/1980 | Bauer | 260/18 EP |
| 4,367,919 | 1/1983 | Tung et al. | 350/150 |
| 4,388,359 | 6/1983 | Ethen et al. | 428/143 |
| 4,521,129 | 6/1985 | Krech et al. | 404/10 |
| 4,564,556 | 1/1986 | Lange | 428/325 |
| 4,652,172 | 3/1987 | Eigenmann | 404/73 |
| 4,758,469 | 7/1988 | Lange | 428/325 |
| 4,772,155 | 9/1988 | Dinitz | 404/7 |
| 4,772,511 | 9/1988 | Wood et al. | 428/325 |
| 4,875,798 | 10/1989 | May | 404/12 |
| 4,937,127 | 6/1990 | Haenggi et al. | 428/148 |
| 4,983,458 | 1/1991 | Dejaiffe | 428/402 |
| 5,053,253 | 10/1991 | Haenggi et al. | 427/204 |
| 5,069,577 | 12/1991 | Murphy | 404/11 |
| 5,094,902 | 3/1992 | Haenggi et al. | 428/150 |
| 5,124,178 | 6/1992 | Haenggi et al. | 427/204 |
| 5,268,789 | 12/1993 | Bradshaw | 359/534 |
| 5,310,278 | 5/1994 | Kaczmarczik et al. | 404/14 |
| 5,417,515 | 5/1995 | Hachey et al. | 404/15 |

METHOD OF MAKING RETROREFLECTIVE ELEMENTS

FIELD OF THE INVENTION

The present invention relates to a method of making retroreflective elements which can be placed in pavement markings to guide and direct motorists traveling on a roadway.

BACKGROUND OF THE INVENTION

The use of pavement markings (e.g., paints, tapes, and individually mounted articles) to guide and direct motorists traveling along a roadway is well known. During the daytime the markings may be sufficiently visible under ambient light to effectively signal and guide a motorist. At night, however, especially when the primary source of illumination is the motorist's vehicle headlights, the markings are generally insufficient to adequately guide a motorist because the light from the headlight hits the pavement and marking at a very low angle of incidence and is largely reflected away from the motorist. For this reason, improved pavement markings with retroreflective properties have been employed.

Retroreflection describes the mechanism where light incident on a surface is reflected so that much of the incident beam is directed back towards its source. The most common retroreflective pavement markings, such as lane lines on roadways, are made by dropping transparent glass or ceramic optical elements onto a freshly painted line such that the optical elements become partially embedded therein. The transparent optical elements each act as a spherical lens and thus, the incident light passes through the optical elements to the base paint or sheet striking pigment particles therein. The pigment particles scatter the light redirecting a portion of the light back into the optical element such that a portion is then redirected back towards the light source.

In addition to providing the desired optical effects, pavement markings must withstand road traffic and weathering, adverse weather conditions, and cost constraints.

Somewhat vertical or upwardly disposed surfaces provide better orientation for retroreflection than do horizontal surfaces; therefore, numerous attempts have been made to incorporate vertical surfaces in pavement markings, typically by providing protrusions in the marking surface. In addition, vertical surfaces may prevent the build-up of a layer of water over the retroreflective surface during rainy weather which otherwise interferes with the retroreflection mechanism.

One means of providing vertical surfaces is to place raised pavement markers at intervals along a pavement marking line (e.g., U.S. Pat. Nos. 3,292,507; 4,875,798). These markers are relatively large, generally several centimeters in width and 5 to 20 millimeters in height. Typically, the markers require assembling together different components, some of which were previously individually molded or casted. Therefore, the markers are relatively expensive to manufacture. The size of the markers subjects them to substantial impact forces from passing vehicles. As a result, the markers must be substantially secured to the pavement, increasing the installation costs and removal costs when they wear out. Moreover, because the markers are applied at intervals, the bright spots of light are discontinuous, rather than the desired continuous bright line.

Embossed pavement marking tapes are a second means of providing vertical surfaces (e.g., U.S. Pat. Nos. 4,388,359, 4,069,281, and 5,417,515). Selective placement of transparent optical elements on the vertical sides of the embossed protrusions results in a highly effective marking material. However, such tapes are relatively expensive compared to conventional painted markings, and thus their use is often limited to critical areas such as unlighted intersections and railway crossings. Also, these embossed tapes are constructed with polymeric materials which are susceptible to wear.

A third means of providing vertical surfaces for retroreflection is a composite retroreflective element or aggregate (e.g., U.S. Pat. Nos. 3,254,563, 4,983,458). Many variations are known, but the retroreflective elements essentially have a core with optical elements embedded in the core surface. Some known embodiments also contain optical elements dispersed throughout the core that become exposed upon wear. The core may be irregular in shape or may be shaped into spheres, tetrahedrons, discs, square tiles, etc. Retroreflective elements are advantageous because they can be embedded into inexpensive painted markings.

Retroreflective elements are largely comprised of polymeric cores or binders. A pigmented core or binder often serves as a diffuse reflector. This arrangement allows spherical optical elements to be used on either horizontal or vertical surfaces. Other constructions have transparent optical elements comprising a specular reflector such as metallic silver. The metallic surface directs light back towards the source and a pigmented core is not necessary. Because of the geometry of the optics, a specular coated optical element would not be as effective if embedded in a pavement marking paint (a horizontal surface), and would be more highly effective if embedded in the vertical surfaces of a retroreflective element.

Another retroreflective element construction, U.S. Pat. No. 3,252,376, only has silvered glass flakes serving as a specular reflector on the surface of a spherical polymeric core without the use of spherical optical elements.

Another known construction is a retroreflective element where a plastic globule (lens) refracts incident light onto a layer of glass optical elements attached to the bottom portion of the globule. The glass optical elements then focus the light onto a specular coating or film located below the optical elements, where the light is then reflected back along the original path towards the source (e.g., U.S. Pat. Nos. 4,072,403; 4,652,172; 5,268,789).

Shaped polymeric retroreflective elements with a pigmented core and glass optical elements embedded in the vertical surfaces are disclosed in U.S. Pat. No. 3,418,896. These retroreflective elements are formed by extruding the pigmented polymer into rods of different cross-sectional shape. Glass optical elements are embedded into the surface of the polymer before it hardens, then the rods are sliced to form the desired elements.

Polymeric retroreflective elements are undesirably susceptible to wear, especially in high traffic regions, and to degradation due to weathering. In an attempt to overcome these limitations, retroreflective elements were constructed having a ceramic core and glass optical elements with a metallic specular coating.

One type of construction is a rock or glass sphere core (U.S. Pat. Nos. 3,043,196 and 3,175,935) covered by a polymeric binder with glass optical elements having a specular metallic coating embedded in the polymeric coating.

Another construction disclosed in U.S. Pat. No. 3,556,637 has a glass sphere and a layer of glass optical elements attached to the bottom of the glass sphere with a polymeric binder. A metallic film below the glass optical elements acts as a specular reflector.

Other known constructions include a composite lens element serving both as a retroreflective element and a skid-resistant particle (EP 0,322,671). The skid-resistant particle which acts as a core (either a corundum particle or glass sphere) is coated with a pigmented polymeric binder which acts as a diffuse reflector.

A ceramic element having glass optical elements embedded throughout a glass core and at the surface of the core is disclosed in U.S. Pat. No. 3,171,827. A thin metallic film separates the optical elements and the glass core to provide an efficient specular retroreflective system. Alternatively, optical elements having a high refractive index (greater than 2.0) are used. These high refractive index optical elements are said to be capable or reflecting light without the need for a reflective backing.

A ceramic retroreflective element having a transparent glass sphere with smaller glass optical elements embedded into the surface is disclosed in U.S. Pat. Nos. 3,274,888 and 3,486,952. Again a thin metallic film separates the optical elements and the glass sphere to provide an efficient specular retroreflective system. The elements are formed by first coating the glass spheres with metallized optical elements using a temporary polymeric binder. The coated spheres are then tumbled with excess optical elements in a rotary kiln. When the temperature exceeds the softening temperature of the glass spheres, the optical elements embed themselves into the surface of the spheres. Later the film is etched away from the exposed portion of the optical elements.

WO 97/28471 discloses a retroreflective element comprising an opacified ceramic core and ceramic optical elements partially embedded into the core. The diffuse reflecting ceramic core, in combination with the transparent optical elements embedded in the surface, provides a surprisingly bright retroreflective element without the gray coloration and the susceptibility to corrosion associated with metallic specular reflectors. Although these all-ceramic retroreflective elements have greatly improved resistance to wear and the effects of weathering, enhanced crush-resistance is desirable to increase the life of the retroreflective element.

SUMMARY OF THE INVENTION

The present invention provides a method of making a ceramic retroreflective element having enhanced strength and increased retained reflectivity. The method of the present invention comprises forming retroreflective elements by the following steps:
 a) providing glass flakes;
 b) coating said glass flakes with a first barrier layer yielding coated glass flakes;
 c) providing optical elements;
 d) optionally coating said optical elements with a second barrier layer;
 e) blending said optical elements and said coated glass flakes;
 f) heating said optical elements and said coated glass flakes to spheroidize said flakes while agitating said optical elements and said coated glass flakes;
 g) further heating said optical elements and said spheroidized glass flakes to partially embed said optical elements in said spheroidized flakes while agitating said optical elements and said spheriodized flakes; and
 h) cooling said spheroidized flakes having partially embedded optical elements.

Preferably, continuous agitation is provided throughout the process.

The retroreflective elements are substantially spheroidal, which reduces sharp edges and points which enhances resistance to crushing and chipping of the retroreflective element on a roadway.

BRIEF DESCRIPTION OF DRAWINGS

The FIGS., which are idealized and not to scale, are intended to be merely illustrative and non-limiting.

DETAILED DESCRIPTION OF ILLUSTRATIVE EMBODIMENTS

The present invention provides a method of making ceramic retroreflective elements particularly useful in imparting retroreflection to liquid pavement markings. The ceramic retroreflective element is bonded together in final form without the aid of polymeric materials. These retroreflective elements can be free of metals or alternatively, the optical elements can be partially coated with a metallic layer. The resultant ceramic retroreflective elements are substantially spheroidal. This shape reduces sharp edges and points which enhances resistance to crushing and chipping of the retroreflective elements on the roadway. Additionally, the low porosity of spheroidal shapes formed by reshaping dense glass flakes may enhance the internal strength of the retroreflective element. This increased strength is evidenced by enhanced crush-resistance and enhanced chipping resistance.

WO 97/28471 discloses various methods for preparing ceramic retroreflective elements. One of the most convenient methods involves agitating a mixture of glass flakes (typically 0.5 to 1.5 mm thick by 1 to 3 mm in width) with spherical optical elements at a temperature above the softening point of the glass flakes. The resulting retroreflective element retains the general shape of the original glass flake.

The present invention provides a method for spheroidizing glass flakes prior to embedment of the optical elements. The flakes must spheroidize prior to embedment of the optical elements because once optical elements embed in the surface of the glass flake, further changes in shape do not occur. Without being bound by theory, the presence of the optical elements may inhibit shape changes because spheroidization of a glass flake requires a reduction in surface area. Thus, optical elements would have to be removed from the surface of the glass flake to permit a reduction in surface area.

A spheroidal retroreflective element is defined by comparing the area encompassed by the profile of the retroreflective element to the area of a circle having an equivalent perimeter. When this ratio is greater than about 0.90, the retroreflective element is considered spheroidal.

The retroreflective elements are comprised of a layer of ceramic optical elements, such as transparent ceramic microspheres, partially embedded in the surface of an opacified, diffusely reflecting, ceramic core such that some of the light incident to the exposed surface of the optical elements is refracted thereby into the core where some of it is reflected so as to re-enter the embedded portion of the optical element, and be refracted such that it exits the exposed portion of the optical element in a direction generally toward the light source. Typically, the retroreflective elements range in size from about 0.5 mm to about 3 mm in diameter. "Ceramic" is used herein to refer to inorganic materials which can be either crystalline (a material having a patterned atomic structure sufficient to produce a characteristic x-ray diffraction pattern) or amorphous (a material having no long range order in its atomic structure evidenced by the lack of a characteristic x-ray diffraction pattern). Amorphous ceramics are more commonly known as glasses. The opacified ceramic cores of this invention will often contain a mixture of amorphous (glass) and crystalline phases.

Optical Elements

A wide variety of ceramic optical elements (e.g., microspheres) may be employed in the present invention. Typically, for optimal retroreflective effect, the optical elements have a refractive index of about 1.5 to about 2.6. The optical elements preferably have a diameter compatible with the size, shape, and geometry of the core or glass flakes. The presently preferred core dimensions range from about 0.5 to about 5 millimeters in diameter. Generally, optical elements of about 50 to about 1000 micrometers in diameter may be suitably employed. Preferably, the ratio of the diameter of the optical elements to the core diameter is no greater than about 1:2. Preferably, the optical elements used have a relatively narrow size distribution for effective coating and optical efficiency.

The optical elements comprise an amorphous phase, a crystalline phase, or a combination, as desired. The optical elements preferably are comprised of inorganic materials that are not readily susceptible to abrasion. Suitable optical elements include microspheres formed of glass, preferably having indices of refraction of from about 1.5 to about 1.9. The optical elements most widely used are made of soda-lime-silicate glasses. Although the durability is acceptable, the refractive index is only about 1.5, which greatly limits their retroreflective brightness. Higher-index glass optical elements of improved durability that can be used herein are taught in U.S. Pat. No. 4,367,919.

Preferably, when glass optical elements are used, the fabrication of the retroreflective element occurs at temperatures below the softening temperature of the glass optical elements, so that the optical elements do not lose their shape or otherwise degrade. The optical elements' softening temperature, or the temperature at which the glass flows, generally should be at least about 100° C., preferably about 200° C., above the process temperature used to form the retroreflective element.

Further improvements in durability and refractive index have been obtained using microcrystalline ceramic optical elements as disclosed in U.S. Pat. Nos. 3,709,706; 4,166,147; 4,564,556; 4,758,469 and 4,772,511. Preferred ceramic optical elements are disclosed in U.S. Pat. Nos. 4,564,556 and 4,758,469, which are incorporated herein by reference in their entirety. These optical elements comprise at least one crystalline phase containing at least one metal oxide. These ceramic optical elements also may have an amorphous phase such as silica. The optical elements are resistant to scratching and chipping, are relatively hard (above 700 Knoop hardness), and are made to have a relatively high index of refraction.

Optionally, the optical elements may be vapor coated with a metal (e.g., aluminum). See U.S. Pat. No. 2,963,378 (Palmquist et al.) incorporated by reference herein, for a description of vapor coated optical elements.

The optical elements may comprise zirconia, alumina, silica, titania, and mixtures thereof.

When optical elements having a crystalline phase are used, the retroreflective element fabrication temperature preferably does not exceed the temperature at which crystal growth occurs in the crystalline component of the optical elements, otherwise the optical elements may deform or lose their transparency. The transparency of the optical elements depends in part on maintaining the crystal size below the size at which they begin to scatter visible light. Generally, the process temperature used to form the retroreflective element is limited to about 1100° C., and preferably to less than 1050° C. Higher process temperatures may cause the optical elements to cloud with a corresponding loss in retroreflective effectiveness.

The optical elements can be colored to match the binder (e.g., marking paints) in which they are embedded. Techniques to prepare colored ceramic optical elements that can be used herein are described in U.S. Pat. No. 4,564,556. Colorants such as ferric nitrate (for red or orange) may be added in the amount of about 1 to about 5 weight percent of the total metal oxide present. Color may also be imparted by the interaction of two colorless compounds under certain processing conditions (e.g., $TiO_2$ and $ZrO_2$ may interact to produce a yellow color).

Glass Flakes

The diffuse reflection exhibited by the glass flakes is an important factor in determining the retroreflective performance of a retroreflective element of the invention.

Glass is an attractive core material because it can be processed at low temperatures and thus at a lower cost. However, conventional glasses tend to be fully dense, single phase materials which do not provide the light scattering desired for use as core materials. A special class of ceramics containing both glass phases and crystalline phases are known to provide excellent scattering. These materials are known as opaque glazes when applied as a coating on a ceramic and as opaque porcelain enamels when applied as a coating on a metal. Because opaque glazes and opaque porcelain enamels contain a large portion of glass, they are often referred to, and are referred to herein, as opacified glasses.

Silicates having a refractive index typically in the range of about 1.5 to about 1.6 are used in both opaque glazes and opaque porcelain enamels. To obtain an adequate difference in refractive index, a scattering phase with a high refractive index is desirable for use in the opacified glass. Materials (opacifiers or opacifying agents) which are commonly used for this purpose include tin oxide ($SnO_2$) with a refractive index of about 2.04; zircon ($ZrSiO_4$) with a refractive index of about 1.9 to about 2.05; calcium titanate ($CaTiO_3$) with a refractive index of about 2.35; and titania ($TiO_2$), anatase and rutile, with a refractive index ranging from about 2.5 to about 2.7.

Other illustrative opacifying agents suitable for use herein include, but are not limited to, $CaTiOSiO_4$ (refractive index of about 1.95 to about 2.09); $Ca_3Ti_2O_7$ (refractive index of about 2.16 to about 2.22); $Na_2Ti_2Si_2O_9$ (refractive index of about 1.91 to about 2.02); $BaTiO_3$ (refractive index of about 2.4); $MgTi_2O_5$ (refractive index of about 2.11 to about 2.23); and $MgTiO_3$ (refractive index of about 1.95 to about 2.3).

Preferably, the crystalline phase required for opacity, and thus, sufficient light scattering, is achieved by dissolving the opacifier in the molten glass, quenching the glass to prevent the crystalline phase from precipitating, and then allowing the crystalline phase to precipitate when re-heated to a temperature sufficient to allow precipitation to occur, but low enough to avoid rapid growth of crystals. However, in some cases, the opacifier may not dissolve in the glass, and may be added to the glass as a separate component. Most titania opacified glasses contain 15 to 20 weight percent titania which is largely in solution until the porcelain enamel is fired, typically greater than about 700° C. The titania precipitates into crystals, typically about 0.2 micrometers in size. Zircon has a solubility in many glasses of about 5 weight percent at about 1200° C. The customary amount of zircon in the glaze is about 8 to about 10 weight percent, so while much of the zircon is precipitated from the glass, some of the zircon remains undissolved in the molten glass. Therefore, the zircon raw material used in the glaze preferably is milled to a fine crystal size (i.e., typically ranging from about 0.05 micrometer to about 1.0 micrometer) before addition to the glass formulation.

Many variations of titania and zircon opacified glasses are sold commercially. Glass and opacifier are available as a homogeneous single material (i.e., the manufacturer has blended and heated the ingredients together to form a melt and then cooled and ground the resulting material which is then sold as a flake or a powder). The glass flake and the opacifier powder may also both be obtained separately and then combined in the manufacturing process. Zirconia ($ZrO_2$) may also be used as an opacifying additive. In this case, the zirconia often reacts with silica in the base glass to form zircon. If desired, additional opacifier can be added to an opacified frit. For example, additional zircon powder can be added to a zircon opacified glass frit. When opacifiers are used in this fashion, powders in the size range of 0.05 to 1 micrometer are particularly useful. This size assists in complete solution of the powder in the glass, or in cases where the glass is already saturated with the opacifier, insures that the undissolved material is in the desired size range for scattering. Preferably, during the manufacturing process, the powdered opacifier and the glass powder are completely and uniformly mixed. Complete mixing is preferred to avoid agglomeration of any of the components. Typically, as known in the art, by proper mixing and by the use of dispersants, agglomeration can be avoided.

The glass flakes are substantially free of porosity when visually observed using an optical 10 power microscope. Typically, the core (glass flakes) ranges in size from about 0.5 mm to about 4 mm in diameter, preferably from about 1.2 mm to about 2 mm in diameter.

Preferably, the core material does not react with or solubilize the optical elements, as this tends to reduce transparency and can distort the optical element shape, thereby impairing retroreflective performance of the final product.

Barrier Layer Materials

The first barrier layer coats the glass flakes to prevent the optical elements from partially embedding in the glass flakes (i.e., the core) prior to spheroidization. Without being bound by theory, it is believed that the barrier layer increases the softening temperature at the surface of the glass flake which allows the glass flake to spheroidize prior to optical element embedment.

The first barrier layer material is incorporated into the glass flake. Suitable first barrier layer materials include, but are not limited to, silica from sol, titania powder, mica powder and mixtures thereof. When a powdered material is used as the first barrier layer, preferably the powder naturally adheres to the surfaces of the glass flakes and evenly distributes over the surface during blending. For ease of processing, the presently preferred material is silica from sol. When silica from sol is used as the first barrier layer material, the glass flakes are coated with a thin continuous film, typically having a coating thickness less than 1 micron. When a powder material is used as a first barrier layer, typically the powder is finely ground with an average size of less than 1 micron.

Typically from about 0.01 to about 0.5 percent by weight of first barrier layer material is used based upon the glass flake, preferably about 0.025 to about 0.3 percent by weight based upon the glass flake. Levels of material below about 0.01 percent by weight adversely impacts spheroidization and levels of material above about 0.5 percent by weight require an increased temperature for optical element embedment. The increased temperature increases production costs and may affect the coloring of the glass flake.

A second barrier layer may optionally be coated onto the optical elements. This layer may help prevent the first barrier layer from leaving the glass flakes. Otherwise, powder originally adhered to the glass flake may be transferred to surfaces of the optical elements which are normally present in greater bulk during processing. When a powdered material is used as the second barrier layer, preferably the powder naturally adheres to the surfaces of the glass flakes and evenly distributes over the surface during blending. Typically, when added, from about 0.01 to about 0.3 percent by weight, preferably about 0.05 to about 0.2 percent by weight of second barrier layer material is used to coat the optical elements. If more second barrier layer material is used, the brightness of the retroreflective element is likely to be lower.

Suitable second barrier layer materials include, but are not limited to, titania, zirconia, and silica (from sol).

It is also possible to avoid loss of the first barrier material from the glass flake by bonding it to the surface of the glass flake. A convenient method of accomplishing this is to heat the coated glass flake to a temperature just above the softening point of the glass, causing the powder to become partially embedded in the glass surface.

The barrier layer materials cannot adversely interact with other components of the retroreflective element. Preferably, the barrier layer materials have a high index of refraction which contributes to light scattering because the materials may remain on the glass flake or optical elements, particularly on the portion of the optical elements in contact with the glass flake.

The first and the second barrier layer material may be the same or may differ. If the same material is used for each barrier layer, the particle size used for each layer may differ.

When the barrier layer on the glass flakes is not bonded to the glass it may be desirable to wash the retroreflective elements after formation to enhance brightness. Washing removes the barrier material adhered to the outer surfaces of the optical elements to enhance the brightness.

Optional Additives

Other materials may be included within the retroreflective elements. These may be materials added to the core material during preparation, added to the core material by the supplier, and/or added to the retroreflective elements during coating with the optical elements. Illustrative examples of such materials include pigments, skid-resistant particles, particles which enhance the mechanical bonding between the retroreflective element and the binder.

Pigments may be added to the core material to produce a colored retroreflective element, in particular yellow may be desirable for yellow pavement markings. For example, praseodymium doped zircon (($Zr$, $Pr$)$SiO_4$) and $Fe_2O_3$ or NiO in combination with TiO$_2$ may be added to provide a yellow color to better match aesthetically a yellow liquid pavement marking often used in centerlines. Cobalt zinc silicate ((Co, Zn)$_2$SiO$_4$) may be added to match a blue colored marking. Colored glazes or porcelain enamels may also be purchased commercially to impart color, for example yellow or blue.

Pigments which enhance the optical behavior may be added. For example, when neodymium oxide (Nd$_2$O$_3$) or neodymium titanate (Nd$_2$TiO$_5$) is added, the perceived color depends on the spectrum of the illuminating light.

Skid-resistant particles may be substituted for some of the optical elements on the surface of the retroreflective elements. They are useful on retroreflective and non-retroreflective pavement markings to reduce slipping by pedestrians, bicycles, and motor vehicles. The skid-resistant particles can be, for example, ceramics such as quartz, aluminum oxide, silicon carbide or other abrasive media. Preferred skid-resistant particles include fired ceramic spheroids having a high alumina content as taught in U.S. Pat. Nos. 4,937,127; 5,053,253; 5,094,902; and 5,124,178, the disclosures of which are incorporated herein by reference. Skid-resistant particles typically have sizes ranging from about 200 to about 800 micrometers.

Method

The present invention provides a method of forming ceramic retroreflective elements having a substantially spheroidal shape. The resultant retroreflective elements have enhanced strength and retained reflectivity.

The retroreflective elements are formed using continuous agitation. A continuous process or a batch process where the retroreflective elements are continuously agitated may be used.

The first step involves coating the glass flakes with a first barrier layer. Typically, from about 0.01 to about 0.5 percent by weight based on the weight of the glass flakes of first barrier layer material is blended with the glass flakes until a substantially continuous layer of material is coated over the surface of the glass flakes.

Optionally, the glass flakes may be heated after coating to bond the barrier layer to the glass flakes. The bonding step is especially useful when a powder material is used as the first barrier layer material. For example, the glass flakes may be heated to a temperature ranging from about 500° C. to about 700° C. for about 1 to about 2 minutes. The time and temperature depends upon the material and method of agitation. The heating conditions preferably are such that the powder barrier layer is firmly attached to the glass flakes and is not removed in subsequent handling or by contact with the optical elements.

Optionally, a second barrier layer may be coated on the surface of the optical elements. This second barrier layer material is blended with the optical elements until a substantially continuous layer of material is coated over the surface of the optical elements.

In the third step, the optionally coated optical elements are mixed with the coated glass flakes. Preferably, the optical element to glass flake ratio is about 10:1 on a weight basis. This ratio can vary with equipment, processing conditions, etc. However, the ratio of optical elements to glass flakes preferably is such that there are enough optical elements to minimize clustering, that is bonding of glass flakes to each other during the later processing steps.

In the fourth step, the mixture of the optionally coated optical elements and the coated glass flakes are heated or fired (i.e., heat-treatment applied to a ceramic to consolidate or densify a ceramic, or alter its condition in some manner) to spheroidize the glass flakes. Typically, the firing temperature is in the range of about 750° C. to about 875° C. for about 2 to about 3 minutes. However, the temperature and time may vary with equipment. During the firing process the mixture of glass flakes and optical elements is continuously agitated, for example in a rotary kiln. At this elevated temperature, the opacifier precipitates in the glass, the flakes spheroidize, and the optical elements partially embed in the glass. The firing temperature allows the glass flakes to soften, but is low enough to avoid damaging the optical elements.

While the temperature is elevated, the optical elements become partially embedded in the spheroidized glass flakes or core. Preferably, the optical elements are embedded to a depth sufficient to hold the optical elements in the core during processing and use. For spheroidal optical elements, embedment greater than 30% of the diameter typically will effectively hold the optical element in the core. Preferably, the optical elements are embedded to a depth of about 30% to about 80% of their average diameter, more preferably, about 40% to about 60% of their average diameter. If the optical elements are embedded to a depth less than about 30% of their diameter they tend to readily dislodge from the retroreflective element surface. When the embedded depth exceeds 80%, the amount of light able to access the optical element is undesirably restricted.

The retroreflective elements of the present invention typically are substantially covered by optical elements. The surfaces of the retroreflective elements intended to retroreflect light preferably do not contain major portions that are void of optical elements. The optical elements are essentially close packed on the surfaces intended to retroreflect light.

After optical element embedment, the spheroidal retroreflective element is allowed to cool to room temperature. The rate of cooling affects the strength of the retroreflective element. If the retroreflective element is cooled too rapidly, the retroreflective element can be fractured by thermal shock. For example, small cracks or flaws may result, which decreases chipping resistance and decreases crush resistance.

Evaluation Procedures

1. Spherical Character of the Retroreflective Elements

The spherical character of a batch of retroreflective elements was determined from the profiles of a sample of retroreflective elements. The deviation of these profiles from that of a sphere were measured and the percentage of the retroreflective elements meeting the criteria established for spherical retroreflective elements was determined.

Figure 1:
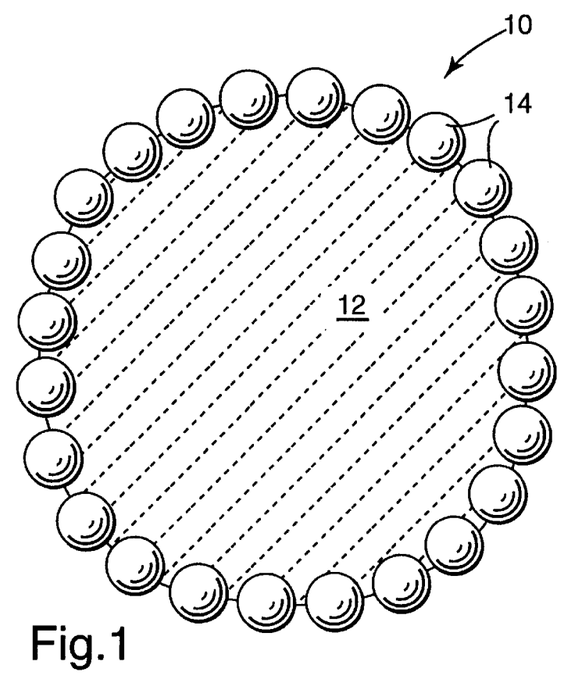
FIG. 1 is a cross-sectional view of a spherical element 10 having core 12 where optical elements 14 are partially embedded in the core.
Figure 2:
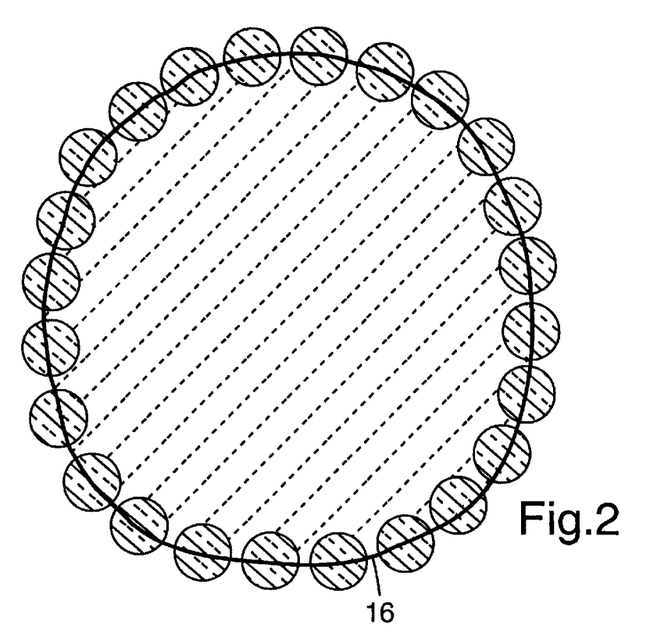
FIG. 2 is a retroreflective element profile showing a tracing or outline 16 of the area used to quantify the spherical character of the element.
Figure 3A:
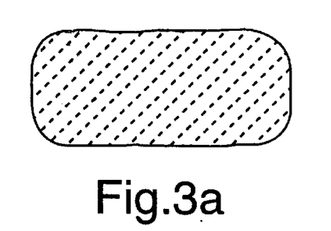
FIGS. 3a, 3b, 3c and 3d are outlines of several different retroreflective element profiles. The A/Ao ratios are (3a) 0.77; (3b) 0.88; (3c) 0.93; and (3d) 0.97.
Figure 3B:
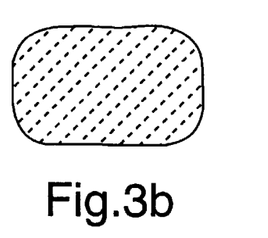
Figure 3C:
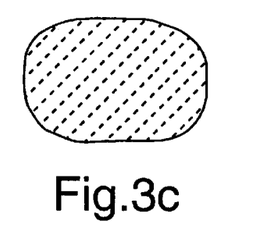
Figure 3D:
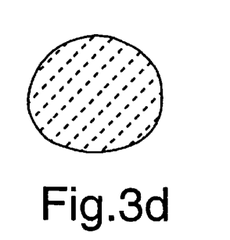

Individual retroreflective elements were viewed in a microscope equipped with a television camera. The image was captured on the video card of a computer and analyzed using the public domain NIH Image software program (developed at the U.S. National Institutes of Health and available on the Internet at http://rsb.info.nih.gov/nih-image/) downloaded in August 1997. The profile of each retroreflective element was traced using the polygon tool of NIH Image. The tracing followed a path along the surface of the glass cores, ignoring the profile of individual optical elements. The heavy black line in FIG. 2 illustrates the tracing of a typical retroreflective element profile. The length of the tracing perimeter (P) and the enclosed area (A) were determined by the measurements feature in NIH Image. The spherical deviation of the profile was quantified by comparing the area of the profile to the area of a circle having the same perimeter. The equivalent area (A$_c$) was determined from the formula:

$$A_c = P^2/4\pi$$

The ratio $A/A_o$ will approach a value of 1.0 as the profile becomes more circular, and it will be less than one for non-circular profiles. FIG. 3 shows some example tracings and the corresponding values of $A/A_o$.

This method can be misleading if a retroreflective element is viewed in only one direction. For example, a disc viewed in one direction may have a circular profile, but a rectangular profile when the viewing direction is rotated 90 degrees. To avoid this ambiguity, each retroreflective element was viewed in two directions separated by a 90 degree rotation. The lowest value of $A/A_o$ was used to characterize the retroreflective element.

A sample of 20 retroreflective elements was measured for each process batch. The percent of retroreflective elements having an area ratio greater or equal to about 0.90 was used to quantify the spherical character of the batch.

2. Chipping and Crush Resistance of the Retroreflective Elements

Experience from testing ceramic retroreflective elements as highway markings revealed three types of degradation: 1) crushing, where a retroreflective element was broken into many small pieces; 2) chipping, where a small portion of the retroreflective element was broken away, especially sharp corners; and 3) optical element shearing, where the ceramic optical elements were broken such that the exposed portion of the optical elements were missing and those portions of the optical elements embedded in the glass core remained. All three types of damage are observed in the grinding resistance test which was developed to predict highway performance.

A 50 g sample of the retroreflective elements was placed in a Size 00 porcelain mill jar, 11.4 cm inside diameter, 1300 ml volume (Norton Chemical Process Products, Akron, Ohio) along with eight High Density Alumina Spheres, 3.8 cm diameter, density 3.4 g/cc U.S. Stoneware Corp., Mahwah, N.J.). The mill jar was rotated at 60 rpm for six 10 minute intervals. After each interval, the fraction of retroreflective elements ground to less than 18 mesh (1 mm) was screened out and discarded. The percentage of the original retroreflective elements remaining after the six intervals was reported as the grind resistance. Preferably, the retroreflective element has a grinding resistance greater than about 70 percent.

3. Retroreflective Brightness of the Retroreflective Elements

The coefficient of retroreflection ($R_A$), following Procedure B of ASTM Standard E809-94a, was measured at an entrance angle of −4.0 degrees and an observation angle of 0.2 degrees. The photometer used for these measurements is described in U.S. Defensive Publication No. T987,003. The retroreflective elements were placed in a small dish, in a quantity sufficient to cover the bottom with several layers of retroreflective elements. The surface of the retroreflective elements was leveled and the dish positioned in the photometer such that the light beam fell completely within the area covered by elements. Preferably, the retroreflective element has a coefficient of retroreflection greater than about 3 candela/lux/meter$^2$.

Applications

The retroreflective elements made using the method of the present invention can be dropped or cascaded onto binders such as wet paint, thermoset materials, or hot thermoplastic materials (e.g., U.S. Pat. Nos. 3,849,351, 3,891,451, 3,935,158, 2,043,414, 2,440,584, and 4,203,878). In these applications, the binder (i.e., the paint, thermoset material, or thermoplastic material) forms a matrix that serves to hold the retroreflective elements in a partially embedded and partially protruding orientation. The matrix can be formed from durable two component systems such as epoxies or polyurethanes, or from thermoplastic polyurethanes, alkyds, acrylics, polyesters, and the like. Alternate coating compositions that serve as a matrix and include the retroreflective elements described herein are also contemplated to be within the scope of the present invention.

Typically, the retroreflective elements made using the method of the present invention are applied to a roadway or other surface through the use of conventional delineation equipment. The retroreflective elements are dropped in a random position or a prescribed pattern if desired onto the surface, and each retroreflective element comes to rest such that it is embedded and adhered to the paint, thermoplastic material, etc. If different sizes of retroreflective elements are used, they are typically evenly distributed on the surface. When the paint or other film-forming material is fully cured, the retroreflective elements are firmly held in position to provide an extremely effective reflective marker.

The retroreflective elements of the present invention can also be used on preformed tapes used as pavement markings.

The following examples illustrate various specific features, advantages, and other details of the invention. The particular materials and amounts recited in these examples, as well as other conditions and details, should not be construed in a manner that would unduly limit the scope of this invention. Percentages given are by weight.

EXAMPLES

Example 1

No Barrier Layers (Comparison)

Glass flakes sized to −11,+18 mesh (XT-1370, Ferro Corp., Cleveland, Ohio) were mixed with ceramic optical elements (zirconia-silica with a refractive index of 1.76, prepared as described in U.S. Pat. No. 4,564,556) in a weight ratio of about 10:1 optical elements to flakes. The mixture was heated in a rotating tube furnace at about 775° C., the residence time in the hot zone was approximately 2 minutes. During this process optical elements embedded to approximately half their diameter in the surfaces of the glass flakes. The excess optical elements were separated from the finished retroreflective elements by screening the output from the rotary kiln through an 18 mesh sieve.

The finished retroreflective elements retained the shape of the original glass flake, except for some rounding of sharp edges. Classification of the retroreflective element shapes using the area ratio technique indicated that only about 10% exceeded the value of about 0.90 used to represent a spherical retroreflective element. The grinding test used to determine resistance to crushing and chipping produced a survival value of about 57.8%. A retroreflective brightness value (RA) of about 5.8 (candela/lux/meter$^2$) was measured on the retroreflective elements.

Example 2

Powdered Barrier Layers on the Glass Flakes and the Ceramic Optical Elements

Glass flakes sized to −11,+18 mesh (XT-1370) were mixed with 0.3 wt % of $TiO_2$ powder (R700, Dupont Chemicals, Wilmington, Del.). During mixing the $TiO_2$ naturally coats the surfaces of the glass flakes. Ceramic optical elements (zirconia-silica with a refractive index of 1.76) were mixed with about 0.3 wt % of $TiO_2$ powder (R700). Vigorous agitation caused the $TiO_2$ to coat the surfaces of the optical elements. The coated glass flakes were combined with the coated optical elements in a rotary kiln at a weight ratio of about 10:1 optical elements to flakes. The kiln temperature was about 825° C. and the residence time in the hot-zone was approximately two minutes. The excess optical elements were separated from the finished retroreflective elements by screening the output from the rotary kiln through an 18 mesh sieve. $TiO_2$ powder was washed from the exposed surfaces of the optical elements by tumbling the retroreflective elements in a jar containing water for about 1 hour.

The reflective elements were predominantly spherical in shape with the ceramic optical elements embedded to about half their diameter in the opaque glass core. When fractured the core of the retroreflective element was found to be substantially pore free, i.e. only an occasional isolated pore was observed. Classification of the retroreflective element shapes using the area ratio technique indicated that about 90.0% exceeded the value of about 0.90 used to represent a spherical retroreflective element. The grinding test used to determine resistance to crushing and chipping produced a survival value of about 71.2%. A retroreflective brightness value ($R_A$) of about 4.0 (candela/lux/meter$^2$) was measured on the retroreflective elements.

Example 3

Powdered Barrier Layer Bonded to the Glass Flakes, No Barrier Layer on the Ceramic Optical Elements Glass flakes sized to —11,+18 mesh (XT-1370) were mixed with 0.3 wt % of $TiO_2$ powder (R700). The coated flakes were fired at about 650° C. in a rotating tube furnace with a hot zone residence time of approximately 2 minutes. The fired flakes were then combined with uncoated ceramic optical elements (zirconia-silica with a refractive index of 1.76) in a rotary kiln at a weight ratio of about 10:1 optical elements to flakes. The kiln temperature was about 825° C. and the residence time in the hot-zone was approximately two minutes. The excess optical elements were separated from the finished retroreflective elements by screening the output from the rotary kiln through an 18 mesh sieve.

The reflective elements were predominantly spherical in shape with the ceramic optical elements embedded to about half their diameter in the opaque glass core. When fractured the core of the retroreflective element was found to be substantially pore free, i.e., only an occasional isolated pore was observed. Classification of the retroreflective element shapes using the area ratio technique indicated that about 80.0% exceeded the value of about 0.90 used to represent a spherical retroreflective element. The grinding test used to determine resistance to crushing and chipping produced a survival value of about 80.2%. A retroreflective brightness value ($R_A$) of about 4.5 (candela/lux/meter$^2$) was measured on the retroreflective elements.

Example 4

Colloidal Sol Barrier Layer on the Glass Flakes, No Barrier Layer on the Ceramic Optical Elements A 0.05 weight % $SiO_2$ coating was applied to glass flakes sized to −10,+18 mesh (XT-1370) using colloidal silica sol (1042; Nalco Chemical Company of Chicago, Ill. 60638). The silica sol was filtered through a #54 Whatman filter paper, then diluted to a silica content of about 0.4 wt % with additional water. The diluted sol was mixed with the glass flakes and tumbled in a heated rotary drum until dry. The flakes were then combined with uncoated ceramic optical elements (zirconia-silica with a refractive index of 1.76) in a rotary kiln at a weight ratio of about 10:1 optical elements to flakes. The kiln temperature was about 800° C. and the residence time in the hot-zone was approximately two minutes. The excess optical elements were separated from the finished retroreflective elements by screening the output from the rotary kiln through an 18 mesh sieve.

The reflective elements were predominantly spherical in shape with the ceramic optical elements embedded to about half their diameter in the opaque glass core. When fractured the core of the retroreflective element was found to be substantially pore free, i.e., only an occasional isolated pore was observed. Classification of the retroreflective element shapes using the area ratio technique indicated that about 90.0% exceeded the value of about 0.90 used to represent a spherical retroreflective element. The grinding test used to determine resistance to crushing and chipping produced a survival value of about 77.0%. A retroreflective brightness value ($R_A$) of about 5.6 (candela/lux/meter$^2$) was measured on the retroreflective elements.

What is claimed is:

1. A method of making a retroreflective element comprising the steps of:
   a) providing glass flakes;
   b) coating said glass flakes with a first barrier layer yielding coated glass flakes;
   c) providing optical elements;
   d) optionally coating said optical elements with a second barrier layer;
   e) blending said optical elements and said coated glass flakes;
   f) heating said optical elements and said coated glass flakes to spheroidize said flakes while agitating said optical elements and said coated glass flakes;
   g) further heating said optical elements and said spheroidized glass flakes to partially embed said optical elements in said spheroidized flakes while agitating said optical elements and said spheriodized flakes; and
   h) cooling said spheroidized flakes having partially embedded optical elements.

2. The method according to claim 1, wherein said glass flakes comprise opacified glass.

3. The method according to claim 2, wherein said opacified glass comprises one or more glass opacifying agent(s) selected from the group consisting of $TiO_2$ (anatase), $TiO_2$ (rutile), and $ZrSiO_4$.

4. The method according to claim 3, wherein said glass flakes are heated to precipitate out said opacifying agent prior to spheroidization.

5. The method according to claim 1, wherein said glass flakes range in size from about 0.5 mm to about 4 mm.

6. The method according to claim 1, wherein said glass flakes are substantially free of porosity.

7. The method according to claim 1, wherein said first barrier layer comprises material selected from the group consisting of silica (from sol), titania, mica, and mixtures thereof.

8. The method according to claim 1, wherein said first barrier layer comprises a material which increases the glass flake's softening temperature at said glass flake's surface while allowing the glass flakes to spheroidize.

9. The method according to claim 1, wherein said first barrier layer ranges from about 0.01 to about 0.5 percent by weight based upon said glass flakes.

10. The method according to claim 1, wherein said glass flakes are heated after coating said glass flakes with the first barrier layer to bond the first barrier layer to the flakes.

11. The method according to claim 10, wherein said glass flakes are heated to a temperature ranging from about 500° C. to about 700° C.

12. The method according to claim 1, wherein said optical elements comprise an amorphous phase, a crystalline phase, or mixtures thereof.

13. The method according to claim 1, wherein said optical elements are vapor coated with a metal.

14. The method according to claim 1, wherein said second barrier layer comprises a material selected from the group consisting of silica (from sol), titania, zirconia, and mixtures thereof.

15. The method according to claim 1, wherein said second barrier layer comprises a material which prevents said first barrier layer from leaving said glass flakes to coat said optical elements.

16. The method according to claim 1, wherein said second barrier layer ranges from about 0.05 to about 0.20 percent by weight based upon said glass flakes.

17. The method according to claim 1, wherein said first barrier layer and said second barrier layer comprise the same material.

18. The method according to claim 1, wherein said first barrier layer and said second barrier layer comprise different materials.

19. The method according to claim 1, wherein said glass flakes are spheroidized at a temperature ranging from about 750° C. to about 875° C.

20. The method according to claim 1, wherein said optical elements are partially embedded to a depth of about 30% to about 80% of their average diameter.

21. The method according to claim 1, wherein spheroidized flakes having partially embedded optical elements are cooled such that thermal shock is minimized.

22. The method according to claim 1, wherein said retroreflective element has a coefficient of retroreflection ($R_A$) greater than about 3 candela/lux/meter$^2$.

23. The method according to claim 1, wherein said retroreflective element has a grinding resistance greater than about 70 percent.

24. A pavement marking comprising:

a) a binder material; and b) one or more retroreflective elements made according to the method of claim 1.

25. The method according to claim 1, wherein said retroreflective element ranges in size from about 0.5 mm to about 3 mm in diameter.

26. The method according to claim 1, wherein said retroreflective element has an $A/A_o$ ratio of at least about 0.90.

* * * * *